United States Patent
Nikovski

(10) Patent No.: US 8,412,649 B2
(45) Date of Patent: Apr. 2, 2013

(54) METHOD FOR CONVERTING DYNAMICAL SYSTEMS WITH CONTINUOUS STATES INTO MARKOV DECISION PROCESSES WITH DISCRETE STATES

(75) Inventor: Daniel N. Nikovski, Brookline, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 579 days.

(21) Appl. No.: 12/649,244

(22) Filed: Dec. 29, 2009

(65) Prior Publication Data

US 2011/0161258 A1 Jun. 30, 2011

(51) Int. Cl.
*G06F 15/18* (2006.01)
(52) U.S. Cl. ........................................ 706/12
(58) Field of Classification Search ........................ None
See application file for complete search history.

(56) References Cited

U.S. PATENT DOCUMENTS

2005/0128139 A1 * 6/2005 Misikangas et al. .......... 342/350

OTHER PUBLICATIONS

"Influence and Variance of a Markov Chain: Application to Adaptive Discretization in Optimal Control", Rémi Munos and Andrew Moore, Proceedings of the 38th Conference on Decision & Control, Phoenix, Arizona USA Dec. 1999.*

* cited by examiner

*Primary Examiner* — Kakali Chaki
*Assistant Examiner* — Luis Sitiriche
(74) *Attorney, Agent, or Firm* — Gene Vinokur; Dirk Brinkman

(57) ABSTRACT

A continuous dynamical system is converted to a Markov decision process (MDP) with discrete states. A predetermined number of continuous states of the continuous system is selected, wherein each continuous state corresponds to one discrete state of the MDP. Delaunay triangulation is applied to the continuous states to produce a set of triangles, wherein vertices of each triangle represent the continuous states. For each discrete state, a next discrete state $y=f(x, a)$ is determined, wherein x represents the continuous state corresponding to the discrete state, a is a control action, and $f$ is a non-linear transition function for the continuous. A particular triangle containing the next discrete state y is identified, and the next discrete state y is expressed as probabilities of transitioning to the discrete states corresponding to the continuous states x represented by the vertices of the particular triangle.

6 Claims, 4 Drawing Sheets

200

300

400

METHOD FOR CONVERTING DYNAMICAL SYSTEMS WITH CONTINUOUS STATES INTO MARKOV DECISION PROCESSES WITH DISCRETE STATES

FIELD OF THE INVENTION

This invention relates to optimal sequential control of dynamical systems, and more particularly to converting non-linear dynamical systems with continuous state spaces into Markov decision processes (MDP) with discrete state spaces.

BACKGROUND OF THE INVENTION

An operation of a dynamical system is usually described by a means of set of equations that specify a time dependence and evolution of the state of the system under the influence of control actions. At any given time, the dynamical system has a state given by a vector of real numbers, which can be represented in an appropriate state space. Small changes in the state of the dynamical system correspond to small changes in the numbers. Continuous dynamical systems usually operate according to a set of differential equations.

The invention is concerned with automatic control and scheduling of arbitrary non-linear dynamical systems in continuous state spaces with arbitrary transition functions that are controlled by a set of discrete control actions.

Example dynamical systems include robots, vehicles, heating ventilation air conditioning (HVAC) systems, power generators, and household appliances. Typically, the systems are operated by motors, which have a relatively small number of discrete settings, e.g., on and off, or the number of possible settings can be reasonably limited, e.g. setting a thermostat only at integer degrees.

The state of such systems is typically a real-valued vector x in a continuous state space X of the dynamical system. The control actions a of a set A are discrete. The dynamics of the control system can be described by the following set of equations:

$$x_{k+1} = f(x_k, a_k),$$

where $x_k$ is the state of the system at time $t_k$, $a_k$ is the control action applied at time $t_k$, $f$ is an arbitrary non-linear transition function, and the system evolves in discrete time such that $t_k = k\Delta t$ for a selected interval $\Delta t$. A sequence of actions $a_0, a_1, a_2, \ldots$ must be selected such that a measure of performance is optimized. For example, an HVAC system can be optimized by bringing an environment to a desired temperature gradually, with minimum expenditure of energy.

One performance measure is a cumulative cost J over K steps:

$$J = \Sigma_{k=0}^{K} g(x_k, a_k) + h(x_K),$$

where g is a selected operating cost, and h is a terminal cost associated with the final state $x_K$.

Methods for solving this optimization problem for arbitrary functions $f$, g, and h do not exist, only solutions for special cases are known. For example, in a linear quadratic regulator (LQR), a is real, f is linear, and g and h are quadratic in the state x and control a. However, in the general case, the function $f$ is not linear, and the cost functions g and h are not quadratic in the state and control. In such cases, the optimal control can be found by numerical methods.

Another method of describing the evolution of a dynamical system in time is to represent it as a Markov decision process (MDP). The MDP is described by a four-tuple (S, A, R, P), where S is a finite set of states s; A is a finite set of actions a; R is a reward function such that R(s, a) represents the reward (respectively, cost) if action a is taken in state s; and P is a Markovian transition model where P(s'|s, a) represents the probability of ending up in state s' if action a is taken in state s.

Similarly to the case above, the goal is to find a sequence of actions $a_0, a_1, a_2, \ldots$, that optimize a performance measure that is defined in terms of the cumulative reward R(s, a). Methods for finding such an optimal sequence of actions exist for an arbitrary transition model P(s'|s, a).

However, a major distinction between an MDP and a set of differential equations that describes a continuous-state-space dynamical system is that the state space of an MDP is discrete, that is, the system can be only in a limited number of discrete states at any given time. It is thus desired to convert a given continuous-state-space dynamical system into a Markov decision process (MDP) with discrete state space, so that an optimal control sequence can be found for the MDP, and for the continuous-state-space system.

SUMMARY OF THE INVENTION

A continuous dynamical system is converted to a Markov decision process (MDP) with discrete states. A predetermined number of continuous states of the continuous system is selected, wherein each continuous state corresponds to one discrete state of the MDP.

Delaunay triangulation is applied to the continuous states to produce a set of triangles, wherein vertices of each triangle represent the continuous states.

For each discrete state, a next discrete state y=$f$(x, a) is determined, wherein x represents the continuous state corresponding to the discrete state, a is a control action, and $f$ is a non-linear transition function for the continuous.

A particular triangle containing the next discrete state y is identified, and the next discrete state y is expressed as probabilities of transitioning to the discrete states corresponding to the continuous states x represented by the vertices of the particular triangle.

DETAILED DESCRIPTION OF THE PREFERRED EMBODIMENTS

Figure 1:
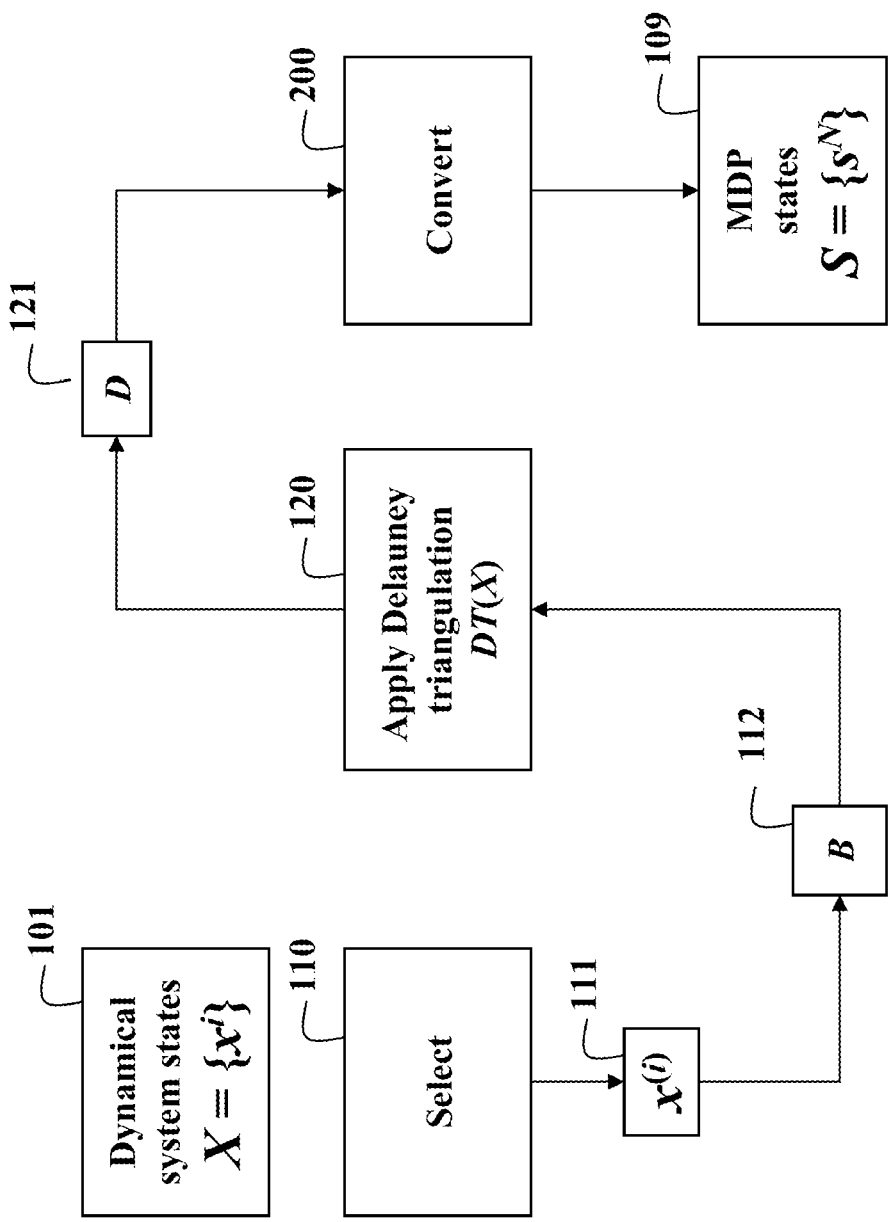
FIG. 1 is a block diagram of a method for converting a dynamical system into Markov decision processes according to embodiments of the invention.

As shown in FIG. 1, the embodiments of the invention provide a method for converting a non-linear dynamical system with a set of continuous states X={$x^i$} 101 to a Markov decision process (MDP) with a set of discrete states S={$s^{(1)}, s^{(2)}, \ldots, s^{(N)}$} 109. The set of discrete states S can be obtained by means of drawing N samples (random or following a systematic order) from the state space of the original system X. One sampling method is to draw samples from a uniform random distribution over X. Another method is to use a regular grid over X.

A probability of transitioning from a current discrete state $s_k$ to a next state $s_{k+1}$ in discrete time due to a control action $a_k$ is $p(s_{k+1}|s_k, a_k)$. The method constructs the transition probability p for every triplet $(s_{k+1}, s_k, a_k)$, such that the states $s_{k+1}$, $s_k$ are in S. For the constructed MDP, an optimal policy $a=\pi(s_k)$, which maps states s onto optimal controls a, can then be found for every state $s_k$ using policy iteration or value.

The construction method is based on similarities in properties of a conditional probability mass function and a convex combination. The conditional probability mass function specifies the probability that a random variable is equal to some specified value. For the MDP, the transition function is such a probability function, conditioned on the current state and the control action.

The random variable for which the probability function is specified is the next state $s_{k+1}$. The elements of the transition function are $$p_i \doteq Pr(s_{k+1}=s^{(i)}|s_k, a_k) = p(s^{(i)}|s_k, a_k).$$

From axiomatic properties of conditional probability mass functions, $$\Sigma_{i=1}^N p_i = 1, \text{ and}$$

$$p_i \geq 0, i=1,N.$$

On the other hand, a convex combination of N vectors $y_i$ is $$\Sigma_{i=1}^N c_i = 1, \text{ and}$$

$$c_i \geq 0, i=1,N.$$

Thus, the conditional probability mass function and the convex combination have the same constraints, i.e., the probabilities of the function and the coefficients of the combination are all non-negative and sum to 1. The probabilities of the conditional probability mass function can be used as coefficients of a valid convex combination, and vice versa. Therefore, the transition functions of the MDP can be constructed as sets of coefficients for suitably defined convex combinations.

System Conversion Method

Figure 2:
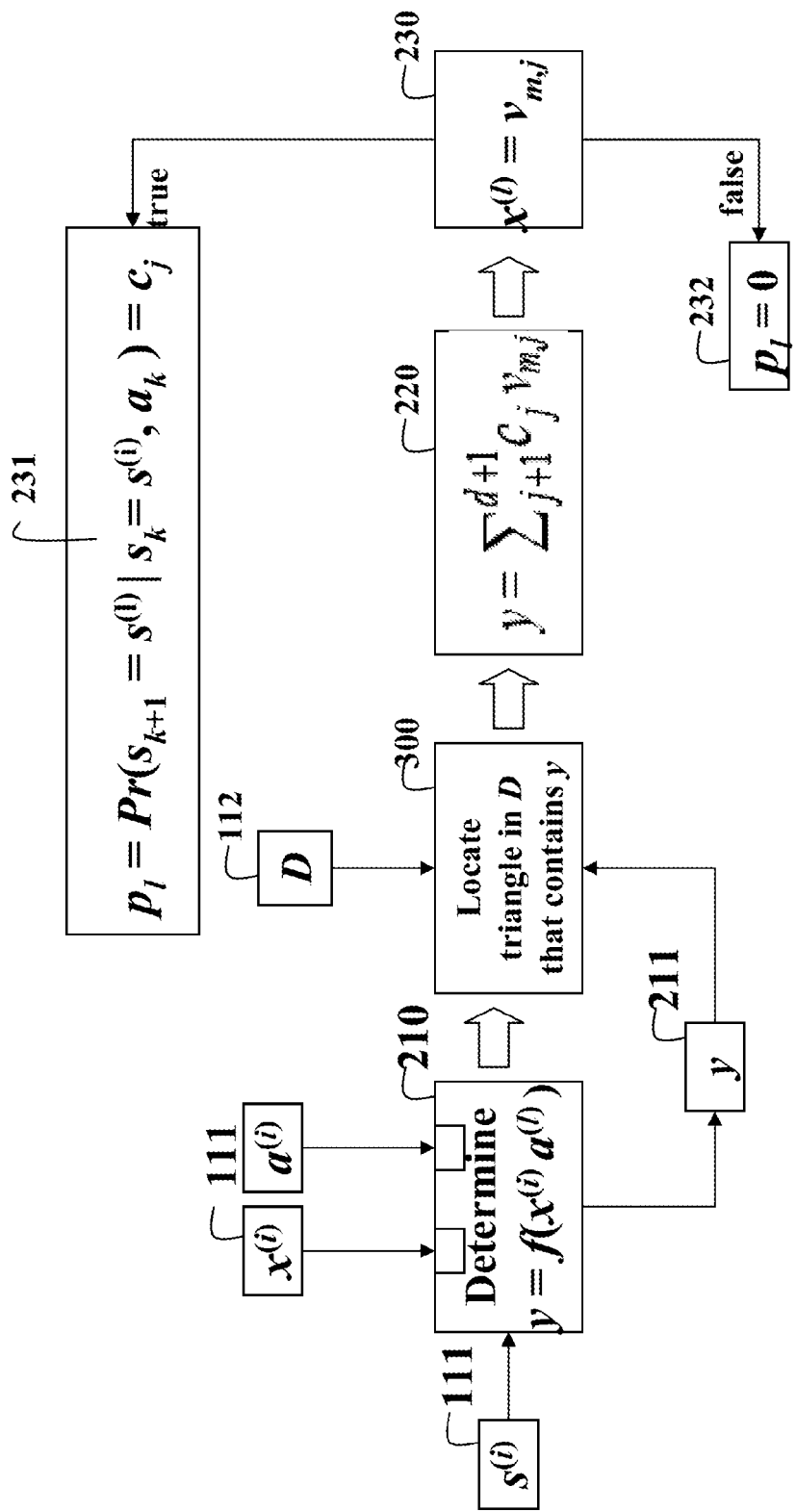
FIG. 2 is a block diagram of steps for converting a continuous state to a discrete state according to embodiments of the invention.
Figure 3:
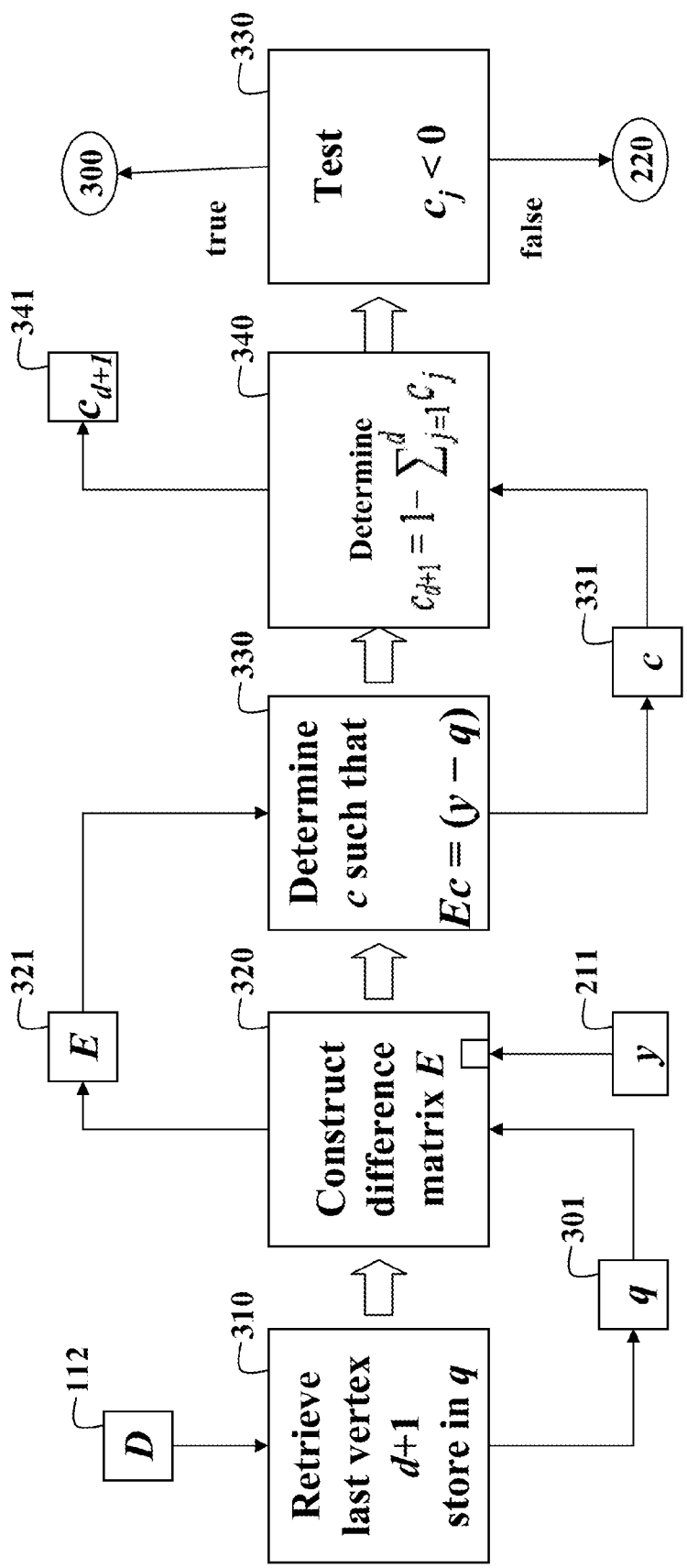
FIG. 3 is a block diagram for traversing triangles representing selected continuous state according to embodiments of the invention.
Figure 4:
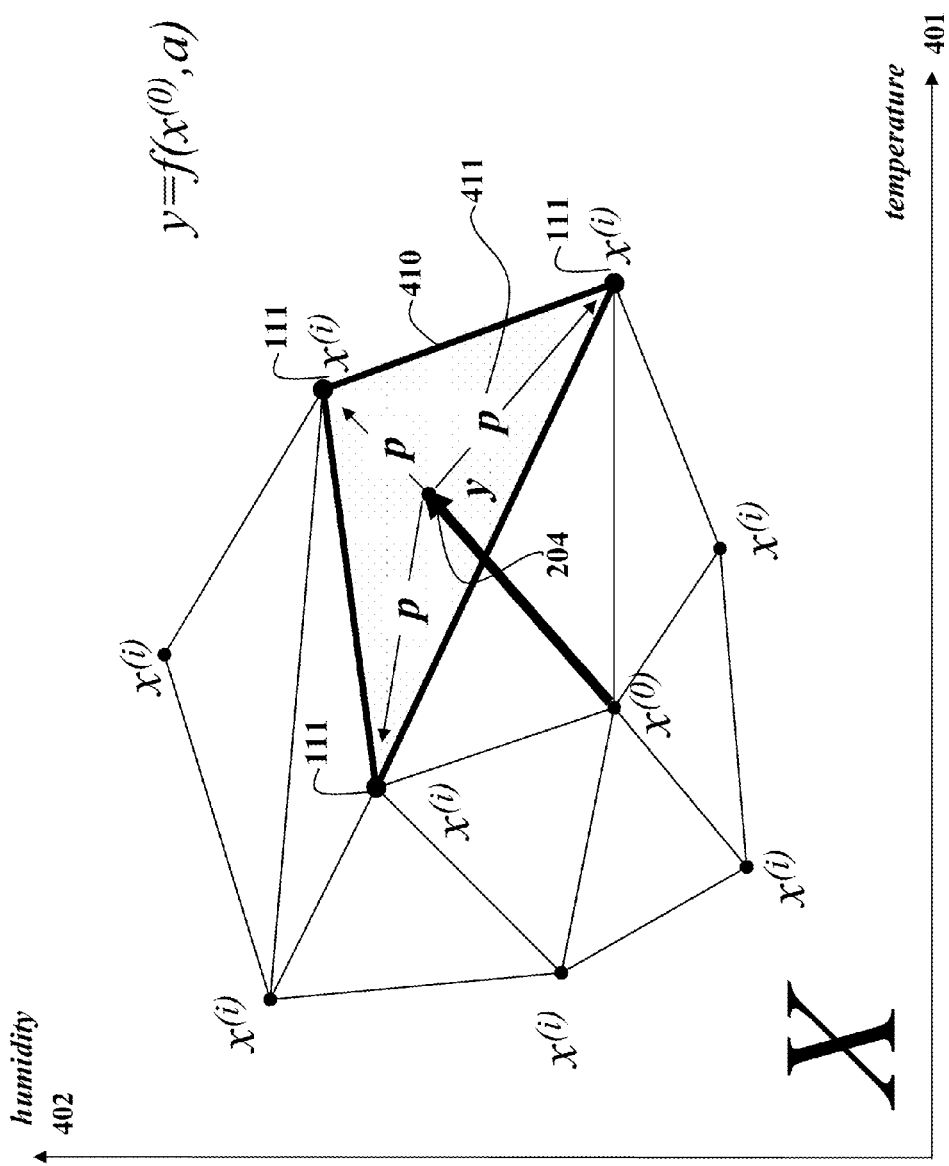
FIG. 4 is a schematic of triangulated continuous states according to embodiments of the invention.

As shown in FIGS. 1-3, the dynamical system has the set X of continuous states $x^{(i)}$ 101. Each state can be represented by a d-dimensional vector. As shown in FIG. 4, the states X for the example HVAC system include continuously varying temperatures 401 and humidities 402.

The method selects 110 N continuous states $x^{(i)}$ 111 from the set X, such that each state $x^{(i)}$ corresponds to one of the N discrete states $s^{(i)}$ in the set S. The selecting can sample the continuous state space uniformly and randomly. The selected states are stored in a d×N matrix B 112, where each column is one of the selected states.

Delaunay triangulation DT(X) is applied 120 to the set. The triangulation produces M triangles m. The triangles are stored in a matrix D 121, where each column corresponds to a triangle, and the three rows correspond to the vertices of the triangles.

Simplex

In general in the specification and claims, each triangle can be replaced by the more general term simplex, which is a generalization of a triangle in a state space X of arbitrary dimensionality d. For example if the number of dimensions d=2, the number of vertices in the simplex (or triangle) is d+1=3, and for d=3, the simplex is a tetrahedron with d+1=4 vertices.

The states s are converted 200 one state at a time as shown in FIG. 2. For each state $s^{(i)}$ the corresponding state $x^{(i)}$ 201 and control $a^{(l)}$ 202 is retrieved 210, and used to 201 and control a determine 210 a next state $y=f(x^{(i)}, a^{(l)})$ 204, where f is an arbitrary non-linear function that describes the evolution of the continuous-state-space system. FIG. 2 shows the case when i=0, and $y=f(x^{(0)}, a)$, for some action a.

In general, the next state y 204 does not coincide with any of the selected states $x^{(i)}$. The particular triangle m 410 in DT(X) that contains the next state y 204 is located 300 by traversing all M triangles as described below for FIG. 3.

For the current triangle m, the last vertex $V_{m,d}+1$ of the triangle m is retrieved and stored 310 in a vector q. A d×d difference matrix E 321 is constructed 320. In the matrix E, column j contains the differences $V_{m,j}-q$, for j=1, d. A d-dimensional vector c is determined such that $Ec=(y-q)$ by solving a set of simultaneous linear equations.

The final element $C_{d+1}$ 341 of the vector c is determined 340 as $C_{d+1}=1-\Sigma_{j=1}^D c_j$.

For every element $C_j$, j=1, d+1, test if $c_j$ is negative, i.e., $C_j<0$. If true, then the triangle m does not contain the state y, increment m, and repeat for the next triangle.

Otherwise, if all $C_j$ are positive, then the triangle m contains the state y. The d+1-dimensional vector c contains coefficients that define a valid convex combination such that $y=\Sigma_{j=1}^{d+1} c_j v_{m,j}$ at step 220. Therefore, the vector c defines a valid probability transition function, because all of its entries are non-negative and sum up to unity.

To construct a complete transition probability distribution for all possible N next states, the following step are performed for each discrete state $s^{(l)}$, l=1, N.

If the state $s^{(l)}$ corresponds to one of the vertices of the triangle m, that is, $x^{(l)}=v_{m,j}$ 230 for some j, then the corresponding transition probability $p_l$ 411 of the MDP is $$p_l = Pr(s_{k+1}=s^{(l)}|s_k=s^{(i)} a_k)|s_k, a_k) \doteq c_j$$

231, and otherwise, $p_l=0$ 232.

Conceptually, the dynamical system represented by the function f equivalent to a probabilistic representation involving only a small set of discrete states $s^{(i)}$ embedded in the continuous states X of the dynamical system.

If the system starts in one of these states, the next state y, in general, will not coincide with another one of these states. The d+1 states that define the vertices of the triangle completely enclose the next state y. That is, the system has transitioned not to the state y, but to the vertices of the corresponding triangle with various probabilities.

The probabilities are equal to a convex decomposition of the state y with respect to the vertices (of the triangle that contains the state y. These probabilities can also be viewed as barycentric coordinates of the state y with respect to the vertices of the enclosing triangle. This is made possible by the similarities between convex combinations and probability mass functions for the MDP.

To decrease processing time, an inverse $E^{-1}$ of the matrix E can be stored for every triangle in the Delaunay triangulation, and then used in step 330 to determine $$c=E^{-1}(y-q),$$

rather than solving a set of linear equations each iteration.

The traversal of the triangles of the Delaunay triangulation can also be improved. It is reasonable to expect that the triangle that encloses the next state y is near the triangle for the current state. If the distance between the current state and the centroid of each triangle is predetermined, the triangles of the Delaunay triangulation can be traversed in increasing order of the distances.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

I claim:

1. A method for converting a continuous system to a Markov decision process (MDP), wherein the continuous system is dynamical and the MDP has discrete states, comprising the steps of:
    selecting a predetermined number of continuous states of the continuous system, wherein each continuous state corresponds to one discrete state of the MDP; and
    applying Delaunay triangulation to the continuous states to produce a set of triangles, wherein vertices of each triangle represent the continuous states, and further comprising for each discrete state;
        determining a next discrete state $y=f(x,a)$, wherein x represents the continuous state corresponding to the discrete state, a is a control action, and $f$ is a non-linear transition function for the continuous;
        identifying a particular triangle containing the next discrete state y; and
        expressing the next discrete state y as probabilities of transitioning to the discrete states corresponding to the continuous states x represented by the vertices of the particular triangle, where identifying the particular triangle is performed by means of forming a d×d difference matrix E, such that column j of the difference matrix E contains a differences $v_{m,j}-v_{m,d+1}$, for $j=1, d$, between an $j^{th}$ vertex $v_{m,j}$ of triangle m and a $d+1^{st}$ vertex $q=v_{m,d+1}$ of the triangle m, and solving a linear system of equations $Ec=(y-q)$, for a vector c, and wherein the triangle m is identified as containing y if all $c_j>0$, $j=1, d$, and $c_{d+1}=1-\Sigma_{j=1}^{D}c_j>0$, wherein the steps are performed in a processor.

2. The method of claim 1, where the discrete states of the MDP are selected by uniform random sampling of a state space X of the continuous system.

3. The method of claim 1, where the discrete states of the MDP are selected by imposing a regular grid on a state space X of the continuous system.

4. The method of claim 1, where an inverse matrix $E^{-1}$ of the matrix E is pre-computed and stored, such that the linear equation can be solved as $c = E^{-1}(y-q)$.

5. The method of claim 1, where the triangles in the Delaunay triangulation are traversed in increasing order of a distance from centroids of the vertices to the state y.

6. The method of claim 1, wherein the triangles are generalized to simplices.

* * * * *